Patented Oct. 20, 1931

1,828,430

UNITED STATES PATENT OFFICE

HENRY H. MORETON, OF SANTA MONICA, CALIFORNIA, ASSIGNOR OF ONE-THIRD TO O. B. ENGLISCH, OF CHICAGO, ILLINOIS, AND ONE-THIRD TO CHARLES F. CRAIG, OF LOS ANGELES, CALIFORNIA

METHOD OF PURIFYING OILS

No Drawing.    Application filed October 8, 1928.   Serial No. 311,242.

This invention is a method of purifying oils so that separation of mechanically suspended particles from the oil may be accomplished in conjunction with acid treatment thereof.

In the art of purifying and reclaiming used or contaminated oils, the only methods which appear to be commercially successful at the present time are those which involve distillation steps similar to those usually practiced in the treatment of crude oil. These methods while more or less successful are open to the objection that expensive apparatus is required for reclaiming the oils, and there is a great loss in the bulk of the reclaimed oil as compared to the volume of contaminated oil treated. Other methods and apparatus have been tried which involve filtering and bleaching operations, but they do not appear to have been commercially successful. One reason is that in the case of used crank case oil, for instance, it has been found impossible to remove the minute carbon particles which are suspended in the oil by filtration. The same is true with respect to the gummy solids or what may be termed the "resins" which are also suspended in the oil.

In a separate application filed concurrently herewith, Serial No. 311,239 is described and claimed a process of precipitating solids mechanically carried by oils, by the use of plaster of Paris or calcium sulphate deposited in the oil, and no claim is made herein for this broad subject matter. As pointed out in the said application the solids mechanically suspended in oil such as the gummy substances which many times discolor new oil, and the carbon and other solids which have been taken up by used oil, such as crank case oil and the like are precipitated by bringing the oil into contact with plaster of Paris or similar calcareous substances.

In the art of purifying oils it is also sometimes desirable to subject the oil to the so-called "acid treatment" i. e. to the action of sulphuric acid for the purpose of removing impurities which cannot be reached by any other known method. But in the acid treatment as now commonly practiced in the art there is always danger of using too much acid, with the result that the acid will be discolored to a more or less permanent degree, and to a sufficient extent to impair its commerical value.

One of the objects of the invention is to reclaim contaminated oils or to purify other oils by a process involving the precipitation of solids, such as carbon, gums and the like mechanically suspended in the oil, simultaneously with a treatment of the oil by sulphuric acid. A further object is to provide a method of removing mechanically suspended solids and subjecting the oil to the acid treatment in such manner that expensive and cumbersome apparatus is not required, that the purifying process is greatly simplified and cheapened, and in a manner which insures that the loss in bulk during the reclaiming or purifying process is reduced to such an extent as to be practically negligible.

The invention will be hereinafter fully set forth and particularly pointed out in the claims.

In the practice of the present invention, the oil is treated by bringing it into contact with a compound which consists of a mixture of calcium sulphate or its equivalent with silica and sulphuric acid. While it is preferred to use calcium sulphate as an ingredient, either in the form of plaster of Paris or gypsum, the invention is not limited to this substance because other calcareous cements may be employed in lieu thereof, such as natural cement, Portland cement and the like, and wherever the term calcium sulphate is used in this specification, it is to be understood that the substances above mentioned are to be considered as equivalents thereof and within the spirit of the invention.

The action of the calcium sulphate as an element of the present compound is identical with that described and claimed in the application for patent above referred to. That is when brought into contact with the oil, either by depositing it into the oil or by making it a substantial constituent of an oil filter, the minute particles of carbon, gums and other solids, which are suspended in oil, such as used crank-case oil for instance, are brought together in such a manner that they may be readily removed. If the first method is employed the impurities may be removed by filtration or by allowing them to settle, and draw off the oil. If the second method is employed the impurities are attracted as they come in contact with the filter bed, and removed as the oil passes through. The carbon particles are ordinarily too fine to be removed by filtration, and the effect of the calcium sulphate is to cause these particles to assume a form and condition by which mechanical separation thereof from the oil may be easily accomplished.

Experience has demonstrated that the introduction of sulphuric acid into the oil simultaneously with the calcium sulphate, and in the absence of any modifying or controlling agencies, tends to destroy the action of the calcium sulphate, because said last mentioned material as soon as it comes into contact with the acid will cake or harden, or both, and its precipitating efficiency is destroyed. In a copending application filed concurrently herewith, Serial No. 311,240, however, is described and claimed a compound for effectively accomplishing the acid treatment of oils. Said compound consists of a mixture of sulphuric acid and silica. It has been discovered that by mixing this compound with the calcium sulphate, the acid treatment of the oil may be effectively carried out, without in any manner impairing or destroying the precipitating properties of the calcium sulphate. It is to be understood, however, that no claim is made herein to the broad mixture consisting of sulphuric acid and silica, because such claims are included in the application above identified, but that the present case is limited to the combination of said mixture of sulphuric acid and silica with calcium sulphate.

Experience has demonstrated that excellent results are obtained by the following mixture:—

Sulphuric acid_____ 1 gallon
Silica _____ 100 pounds
Calcium sulphate_____ 100 pounds The substances are compounded by first mixing the sulphuric acid and the silica in a suitable receptacle and in any desired manner. For instance by pouring the acid over the silica and stirring until they are thoroughly intermixed. The calcium sulphate may then be combined with the acid compound by any suitable method of mechanical mixing. As pointed out in the application for patent above identified, the silica is in the form of powdered quartz or high grade sand between 400 and 200 mesh, preferably at 300 mesh.

In practice, the compound is brought into contact with the oil to be treated, either by depositing it into the oil and allowing it to stand, or by incorporating the compound into a filter bed so as to form a component part thereof. If the precipitation method is employed, the treated oil is allowed to stand until the impurities settle, and the oil drawn off, or the oil may be filtered in any desired or known manner. The time element may be reduced by incorporating the mixture in a filter bed so that the separation may take place as soon as the impurities are attracted by the calcium sulphate.

In addition to the purifying action above described, the mixture if allowed to stand two weeks or more after compounding and before being introduced into the oil, will not only perform the impurity-separating functions above described, but it will also bleach the oil even to the extent of removing the dyes which may be incorporated therein.

If it is desired to subject the oil merely to the acid treatment and a filtering action, without utilizing the peculiar characteristics of the calcium sulphate, as for instance, where the oil is not contaminated with mechanical impurities, any of the well known filtering clays may be substituted for the gypsum. In this connection, it is to be understood by the term "clay" as used in this specification, is meant any of the clays well known in the art for use in filtering and bleaching oil. They are known to vary somewhat in their chemical and physical characteristics, but all clays which are capable of filtering oil, or of bleaching oil, or both are considered within the spirit of the invention. Where clay is substituted for the calcium sulphate, it must be free of moisture and the preferred proportions are as follows:—

Sulphuric acid_____ 1 gallon
Silica _____ 100 pounds
Clay _____ 100 pounds

In practice, the above compound is used as a filter bed, and its effect is to obtain an excellent bleaching of the oil during the filtering process.

The advantges of the invention will be readily understood by those skilled in the art of purifying and reclaiming oils. An important advantage is that the purification of the oil, by removing mechanically suspended solids such as carbon and gummy substances may be accomplished simultaneously with an acid treatment of the oil. With the ingredients compounded in the manner above described the calcium sulphate will not cake or harden, probably because the silica crystals become coated with the acid and the distribution of the acid is such that the objectionable reaction of the acid upon the calcium sulphate is prevented. Apparently the silica acts as an acid carrier to distribute the acid uniformly throughout the oil so that there is insufficient concentration at any point to burn the oil. The absorbent characteristics of the calcium sulphate apparently are such that they have the effect of collecting and depositing the carbon and gummy impurities, so that they may be readily separated. The anhydrous nature of calcium sulphate may possibly be a factor in the action produced thereby. It is to be understood, however, that the above stated theories are more or less conjectural and are not intended to be binding or limiting, the significant fact being that the calcium sulphate does so act upon the mechanically suspended solids that they may be readily separated from the oil, and the acid introduced into the oil by the method described does not burn or discolor the oil.

The calcium sulphate and the clay are both filtering substances. Therefore, a bleaching and filtering action is obtained irrespective of which is used.

Having thus explained the nature of the invention and described an operative manner of constructing and using the same, although without attempting to set forth all of the forms in which it may be made, or all of the forms of its use, what is claimed is:—

1. The method of purifying oil comprising producing a mechanical mixture of sulphuric acid and silica so that the silica becomes a carrier for the acid, then mechanically mixing a calcareous cement therewith, and bringing the final mixture into contact with the oil so as to attract and precipitate solids which are mechanically suspended in the oil, the proportion of said final mixture required to clarify the oil being determined by the extent of precipitation of the solids as the oil and mixture are brought into contact, and finally separating the solids from the oil.

2. The method of purifying oil comprising producing a mechanical mixture of sulphuric acid with finely powdered silica, so that the silica becomes a carrier for the acid, then mechanically mixing the same with a calcareous cement approximately free of water, and then bringing the final mixture into contact with the oil to be purified so as to attract and precipitate solids which are mechanically suspended in the oil, the proportion of the said final mixture required to clarify the oil being determined by the extent of precipitation of the solids as the oil and mixture are brought into contact, and finally separating the purified oil therefrom.

3. The method of purifying oil comprising producing a mechanical mixture of approximately 1 gallon of sulphuric acid, 100 pounds of powdered silica and 100 pounds calcium sulphate, and bringing the mixture into contact with the oil so as to attract and precipitate solids which are mechanically suspended in the oil, the proportion of said mixture required to clarify the oil being determined by the extent of precipitation of the solids as the oil and mixture are brought into contact, and separating the purified oil from the precipitated solids.

4. The method of purifying oil comprising producing a mechanical mixture of sulphuric acid, silica and calcium sulphate, allowing the same to stand for a predetermined period and then bringing the mixture into contact with the oil so as to bleach the oil and attract and preciptate solids which are mechanically suspended in the oil, the proportion of said mixture required being determined by the extent of precipitation of the solids as the oil and the mixture are brought into contact, and finally separating the purified oil from the precipitated solids.

5. The method of treating oil comprising bringing the oil into contact with calcium sulphate so as to attract solid particles suspended in the oil and to render them readily separable from the oil, the proportion of calcium sulphate required being determined by the extent of precipitation of the solids as the oil and calcium sulphate are brought into contact, and at the same time subjecting said oil to an acid treatment, and finally separating the purified oil from the precipitated solids.

6. The method of treating oils comprising bringing the oil into contact with calcium sulphate so as to attract the suspended solid particles and render them readily separable from the oil, the proportion of calcium sulphate required to clarify the oil being determined by the extent of precipitation of the solids as the oil and calcium sulphate are brought into contact, and simultaneously subjecting the oil to the action of a finely powdered substance mechanically carrying sulphuric acid, and finally separating the oil from the precipitated solids.

In testimony whereof I have hereunto set my hand.

HENRY H. MORETON.